US012555378B2

(12) United States Patent
Yamauchi et al.

(10) Patent No.: US 12,555,378 B2
(45) Date of Patent: Feb. 17, 2026

(54) IMAGE ANALYSIS SYSTEM, IMAGE ANALYSIS METHOD, AND PROGRAM (71) Applicant: Sony Interactive Entertainment Inc., Tokyo (JP)

(72) Inventors: Ryutaro Yamauchi, Tokyo (JP); Shinpei Kameoka, Tokyo (JP); Shogo Sato, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 448 days.

(21) Appl. No.: 17/951,684

(22) Filed: Sep. 23, 2022

(65) Prior Publication Data

US 2023/0162499 A1 May 25, 2023

(30) Foreign Application Priority Data

Nov. 22, 2021 (JP) .................................. 2021-189704

(51) Int. Cl.
*G06V 20/40* (2022.01)
*G06V 10/771* (2022.01)
*G06V 10/774* (2022.01)

(52) U.S. Cl.
CPC ............ *G06V 20/44* (2022.01); *G06V 10/771* (2022.01); *G06V 10/774* (2022.01); *G06V 20/46* (2022.01)

(58) Field of Classification Search
CPC .... G06V 20/44; G06V 10/771; G06V 10/774; G06V 20/46; G06V 10/454; G06V 10/764; G06V 10/82
USPC ........................................................ 382/195
See application file for complete search history.

(56) References Cited

U.S. PATENT DOCUMENTS

| 10,867,212 | B2 | 12/2020 | Kwatra et al. | |
|---|---|---|---|---|
| 10,997,421 | B2* | 5/2021 | Khosla | G06V 10/82 |
| 11,406,895 | B2* | 8/2022 | Hammons | A63F 13/86 |
| 11,748,619 | B2* | 9/2023 | Wu | G06V 10/82 |
| | | | | 382/195 |
| 12,045,288 | B1* | 7/2024 | Barut | G06F 16/532 |
| 2005/0125223 | A1 | 6/2005 | Divakaran et al. | |

(Continued)

FOREIGN PATENT DOCUMENTS

| JP | 2005-189832 A | 7/2005 |
|---|---|---|
| JP | 2011-223287 A | 11/2011 |

(Continued)

OTHER PUBLICATIONS

Japanese Decision to Grant dated Jan. 10, 2023, for the Relating Japanese Patent Application No. 2021-189703.

(Continued)

*Primary Examiner* — Jennifer Mehmood
*Assistant Examiner* — Pardis Sohraby
(74) *Attorney, Agent, or Firm* — Fish & Richardson P.C.

(57) ABSTRACT

Disclosed herein is an image analysis system including a machine learning model configured to receive input of an image and to output an image feature quantity and a map source for image analysis, a map generation section configured to generate, on the basis of a vector corresponding to an object and the output map source, an attention map indicative of a region associated with the object in the image, and a token generation section configured to generate a token indicative of a feature associated with an event of the object on the basis of the generated attention map and the image feature quantity.

13 Claims, 8 Drawing Sheets

(56) References Cited

U.S. PATENT DOCUMENTS

| | | | |
|---|---|---|---|
| 2008/0193016 A1 | 8/2008 | Lim et al. | |
| 2009/0249387 A1 | 10/2009 | Magdy et al. | |
| 2017/0065889 A1 | 3/2017 | Cheng | |
| 2017/0124432 A1* | 5/2017 | Chen | G06N 5/04 |
| 2017/0262705 A1* | 9/2017 | Li | G06V 10/82 |
| 2018/0300553 A1* | 10/2018 | Khosla | G06N 3/08 |
| 2020/0186897 A1 | 6/2020 | Dareddy et al. | |
| 2020/0314458 A1 | 10/2020 | Pinel et al. | |
| 2021/0090289 A1* | 3/2021 | Karanam | G06T 7/337 |
| 2021/0365676 A1* | 11/2021 | Valouch | G06V 20/62 |
| 2022/0118363 A1 | 4/2022 | Yerva et al. | |
| 2024/0121098 A1* | 4/2024 | Herder, III | H04L 9/3255 |

FOREIGN PATENT DOCUMENTS

| | | | |
|---|---|---|---|
| JP | 2019509566 A | 4/2019 | |
| JP | 2021-521525 A | 8/2021 | |
| WO | 2020088216 A1 | 5/2020 | |

OTHER PUBLICATIONS

"Learning to Localize Sound Source in Visual Scenes", Arda Senocak, Tae-Hyun Oh, Junsik Kim, Ming-Hsuan Yang, In So Kweon; Proceedingsof the IEEE/CVF Conference on Computer Vision and Pattern Recognition(CVPR), 2018, pp. 4358-4366.

"Learning Unsupervised Video Object Segmentation through VisualAttention", Wenguan Wang, Hongmei Song, Shuyang Zhao, JianbingShen, Sanyuan Zhao, Steven C. H. Hoi, Haibin Ling; Proceedings of theIEEE/CVF Conference on Computer Vision and Pattern Recognition(CVPR), 2019, pp. 3059-3069.

Japanese Office Action dated Sep. 13, 2022, for the Corresponding Japanese Patent Application No. 2021-189703.

Japanese Office Action dated Sep. 20, 2022, for the Corresponding Japanese Patent Application No. 2021-189704.

U.S. Office Action issued Feb. 10, 2025 in co-pending U.S. Appl. No. 17/951,403, 46 pages.

Office Action in Japanese Appln. No. 2021-189703, mailed on Sep. 13, 2022, 7 pages (with English translation).

Office Action in Japanese Appln. No. 2021-189704, mailed on Sep. 20, 2022, 6 pages (with English translation).

* cited by examiner

IMAGE ANALYSIS SYSTEM, IMAGE ANALYSIS METHOD, AND PROGRAM

CROSS REFERENCE TO RELATED APPLICATIONS

This application claims the benefit of Japanese Priority Patent Application JP 2021-189704 filed Nov. 22, 2021, the entire contents of which are incorporated herein by reference.

BACKGROUND

The present disclosure relates to an image analysis system, an image analysis method, and a program.

Visual observation or related methods are primarily used to detect important events in videos such as games for the purpose of video editing.

A technique for mapping sound sources in a video through unsupervised learning by use of an attention map is disclosed in "Learning to Localize Sound Source in Visual Scenes," Arda Senocak, Tae-Hyun Oh, Junsik Kim, Ming-Hsuan Yang, In So Kweon; Proceedings of the IEEE Conference on Computer Vision and Pattern Recognition (CVPR), 2018, pp. 4358-4366. How unsupervised segmentation is performed using gaze point information from eye tracking is disclosed in "Learning Unsupervised Video Object Segmentation Through Visual Attention," Wenguan Wang, Hongmei Song, Shuyang Zhao, Jianbing Shen, Sanyuan Zhao, Steven C. H. Hoi, Haibin Ling; Proceedings of the IEEE/CVF Conference on Computer Vision and Pattern Recognition (CVPR), 2019, pp. 3064-3074.

SUMMARY

In a video such as a game, for example, there are multiple objects in images making up the video. In the case where features are to be detected from the video, it is not easy to detect features (such as events) attributable to a specific object.

The present disclosure has been made in view of the above circumstances, and it is desirable to provide a technique for more easily detecting features focused on a specific object by use of a machine learning model.

According to one embodiment of the present disclosure, there is provided an image analysis system including a machine learning model configured to receive input of an image and to output an image feature quantity and a map source for image analysis, a map generation section configured to generate, on the basis of a vector corresponding to an object and the output map source, an attention map indicative of a region associated with the object in the image, and a token generation section configured to generate a token indicative of a feature associated with an event of the object on the basis of the generated attention map and the image feature quantity.

According to another embodiment of the present disclosure, there is provided an image analysis method including generating, on the basis of a map source output from a machine learning model configured to receive input of an image and to output an image feature quantity and the map source for image analysis, and on the basis of a vector corresponding to an object, an attention map indicative of a region associated with the object in the image, and generating a token indicative of a feature associated with an event of the object on the basis of the generated attention map and the image feature quantity.

According to a further embodiment of the present disclosure, there is provided a program for a computer, including, by a machine learning model, receiving input of an image and outputting an image feature quantity and a map source for image analysis, by a map generation section, generating, on the basis of a vector corresponding to an object and the output map source, an attention map indicative of a region associated with the object in the image, and by a token generation section, generating a token indicative of a feature associated with an event of the object on the basis of the generated attention map and the image feature quantity.

According to the embodiments of the present disclosure, it is possible to more easily detect features focused on a specific object by use of a machine learning model.

The image analysis system embodying the disclosure may further include an event predictor configured to receive input of the generated token and to output a predicted event.

The image analysis system embodying the disclosure may further include a training section configured to train the machine learning model and the event predictor by use of training data including the image, information corresponding to the object that is found in the image and is targeted for prediction of the event, and a label indicative of the event of the object.

In the image analysis system embodying the disclosure, the token generation section may generate the token indicative of the feature associated with the event of the object on the basis of the attention map, the image feature quantity, and the vector corresponding to the object.

In the image analysis system embodying the disclosure, the object may include a first object and a second object, the token generation section may generate a token indicative of a feature associated with an event of each of the first object and the second object on the basis of the generated attention map and the image feature quantity, the event predictor may include a first event predictor configured to predict the event of the first object and a second event predictor configured to predict the event of the second object, the first predictor may receive input of first link information in which the token generated for the first object and the token generated for the second object are arrayed, the first predictor further outputting the event predicted for the first object, the second predictor may receive input of second link information in which the token for the first object and the token for the second object in the first link information are switched with each other, the second predictor further outputting the event predicted for the second object, and the first event predictor and the second event predictor may have a learning parameter in common.

In the image analysis system embodying the disclosure, the token generation section may output multiple tokens indicative of features associated with the event of the object.

In the image analysis system embodying the disclosure, the map source may have multiple unit regions arrayed in a matrix, each of the unit regions including an internal vector having a predetermined number of elements, and the attention map may be generated on the basis of an inner product between the vector corresponding to the object and the internal vector at each of multiple points.

In the image analysis system embodying the disclosure, the machine learning model, as well as an event predictor configured to receive input of the generated token and to output a predicted event, may be trained by use of training data including the image, information corresponding to the object that is found in the image and is targeted for prediction of the event, and a label indicative of the event of the object.

DETAILED DESCRIPTION OF THE PREFERRED EMBODIMENT

A preferred embodiment of the present disclosure is described below with reference to the accompanying drawings. Throughout the ensuing description, the constituent elements having substantially identical functions are represented by the same reference symbols, and redundant explanations are omitted.

The embodiment to be explained hereunder is a system for analyzing video content including images to be output to a display unit during game play. The video content may include sound. What follows is a description of examples of using video content previously recorded and stored typically in a storage apparatus.

Figure 1:
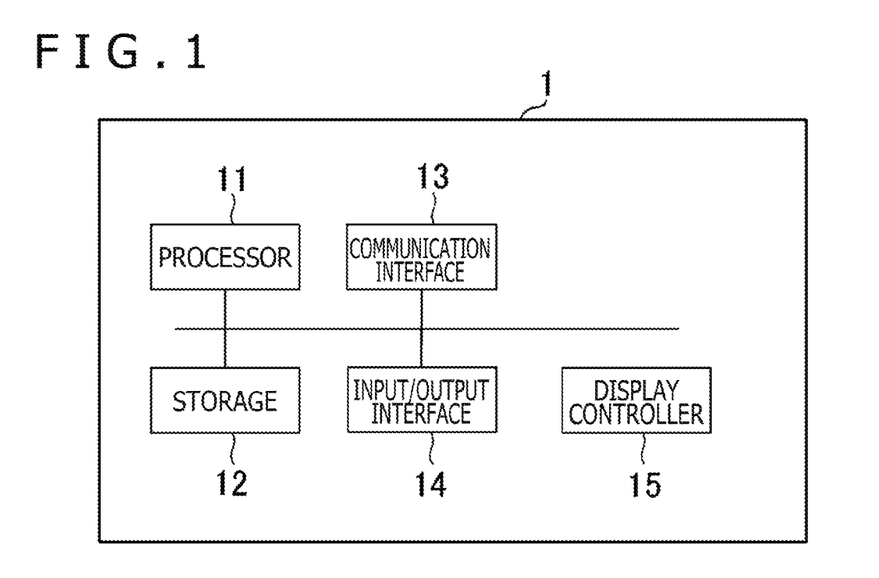
FIG. 1 is a diagram depicting a hardware configuration of an image analysis system according to one embodiment of the present disclosure.

FIG. 1 is a diagram depicting a hardware configuration of an image analysis system according to one embodiment of the present disclosure. The image analysis system includes an information processing apparatus 1. The information processing apparatus 1 is a computer such as a personal computer or a server computer. While only one information processing apparatus 1 is depicted in FIG. 1, there may be multiple computers making up the information processing apparatus 1.

The information processing apparatus 1 includes a processor 11, a storage 12, a communication interface 13, an input/output interface 14, and a display controller 15.

The processor 11 operates according to executive instructions of programs stored in the storage 12. Also, the processor 11 controls the communication interface 13, the input/output interface 14, and the display controller 15. There may be one or multiple processors 11. The executive instructions of the programs may be provided via the Internet or the like or by means of a computer-readable storage medium such as a flash memory or an optical medium (e.g., a digital versatile disk-read only memory (DVD-ROM)).

The storage 12 is configured with a memory device such as a dynamic random access memory (DRAM) or a flash memory and with an external storage device such as a hard disk drive. The storage 12 stores the above-mentioned executive instructions of the programs. Also, the storage 12 stores information and results of calculation input from the processor 11 and from the communication interface 13, for example.

The communication interface 13 is a network interface controller that communicates with other apparatuses. As such, the communication interface 13 includes an integrated circuit configuring a wired local area network (LAN), a wireless LAN, or near-field communication, and a communication terminal or an antenna. The communication interface 13 has a function of communicating with other apparatuses via a network. Under control of the processor 11, the communication interface 13 receives information from other apparatuses, inputs the received information to the processor 11 or to the storage 12, and transmits information to other apparatuses.

The input/output interface 14 is configured with an input/output controller that acquires data from an input device and outputs data to an output device. The input device includes at least one or more of a keyboard, a mouse, a touch panel, a touch pad, a microphone, and a camera. The output device includes speakers, for example. Under control of the processor 11, the input/output interface 14 acquires input data based on a user's operation from the input device, for example, and outputs the input data to the processor 11 or to the storage 12.

The display controller 15 is a graphics controller that controls a display output device. The display controller 15 may include a graphics processing unit (GPU). The display controller 15 outputs display data to the display output device. The display output device is a display apparatus provided inside or outside the information processing apparatus 1.

Figure 2:
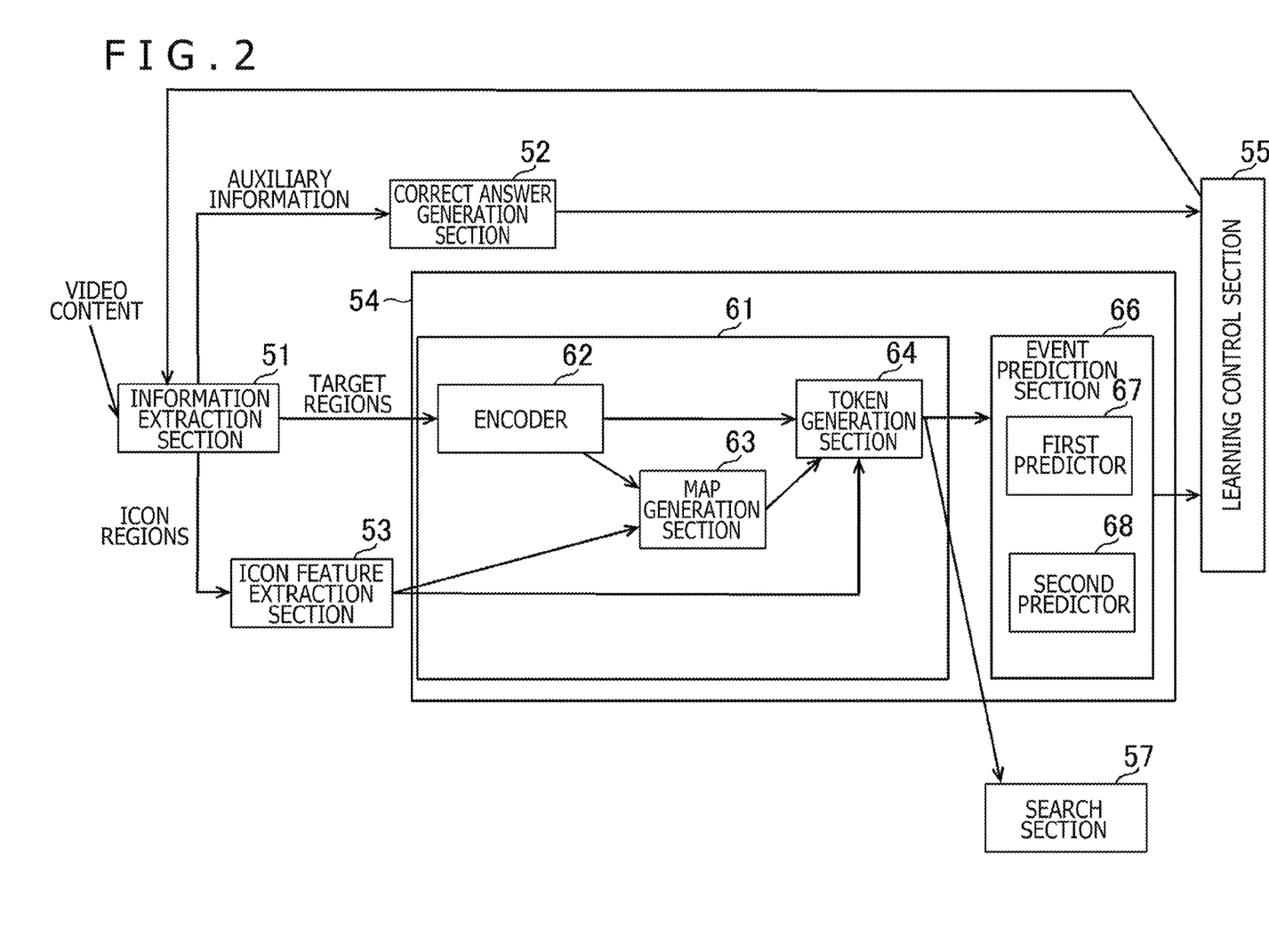
FIG. 2 is a block diagram depicting functions implemented by the image analysis system.

What follows is a description of functions and processes implemented by the image analysis system. FIG. 2 is a block diagram depicting the functions implemented by a sound and image analysis system. The image analysis system functionally includes an information extraction section 51, a correct answer generation section 52, an icon feature extraction section 53, an overall learning model 54, a learning control section 55, and a search section 57. These functions are implemented primarily by the processor 11 executing program instructions that are stored in the storage 12 and correspond to the functional sections so as to control the communication interface 13 and the display controller 15. The overall learning model 54 is one type of machine learning model and includes an image feature generation section 61 and an event prediction section 66. The image feature generation section 61 includes an encoder 62, a map generation section 63, and a token generation section 64. The event prediction section 66 includes a first predictor 67 and a second predictor 68.

The information extraction section 51 extracts, from video content, a target region 70 (see FIG. 5) as a portion of each of multiple images making up the video content, auxiliary information as information different from the target region 70, and an icon region indicative of the type of an object inside the target region 70. In the present embodiment, there are two objects in the target region 70, and there are also two icon regions to be extracted. Here, the information extraction section 51 extracts the target region 70 from each of the multiple images included in the video content. The number of images (i.e., the number of frames) is obtained from a time period of the video content and the number of frames per second, for example. Alternatively, instead of extracting the icon regions, the information extraction section 51 may extract other information indicative of the object types such as character strings. The auxiliary information may be extracted from a partial region in each of the multiple images making up the video content, the region being different from an input region. The auxiliary information may be information indicative of sound included in the video content.

The correct answer generation section 52 generates correct data from the extracted auxiliary information. The correct data may be information indicative of presence or absence of events indicated by the auxiliary information or information indicative of the event types.

The icon feature extraction section 53 generates feature quantities indicative of the object types from the icon regions. More specifically, from the icon regions, the icon feature extraction section 53 generates as the feature quantities a first feature vector and a second feature vector indicative of the respective features of the two objects in the input region. The icon feature extraction section 53 includes a previously trained small-scale machine learning model. The small-scale machine learning model, which includes a convolutional neural network, receives input of images of the two icon regions and outputs the first feature vector and the second feature vector. The machine learning model of the icon feature extraction section 53 may be trained by a metric learning technique in a manner prolonging a metric space between vectors to be output for different objects. The machine learning model of the icon feature extraction section 53 may also include a classifier that classifies objects on the basis of the icon regions. This case may involve previously allocating vectors with random and sufficient metric spaces therebetween to the respective objects and outputting as the first feature vector or the second feature vector the vector assigned to the object determined by an output from the classifier.

The learning control section 55 trains the overall learning model 54 with use of training data including the target region 70 and the correct data. During the training, given a clip that includes images in the video content over a training unit period (e.g., one to two seconds), the overall learning model 54 outputs information indicative of occurrence of an event. The overall learning model 54 receives input of the target regions 70 extracted from multiple images included in one clip. In turn, the event prediction section 66 in the overall learning model 54 outputs information indicative of the event occurrence as a result of event prediction. Here, one clip is divided into multiple frame groups, and the multiple frame groups are processed by the overall learning model 54. One frame group includes images of consecutive k frames (k is an integer in a predetermined range, to be discussed later in detail) among the images included in the clip.

The image feature generation section 61 included in the overall learning model 54 outputs a first token and a second token indicative of respective features of a first object and a second object for each of multiple frame groups generated from the clip. More specifically, for each of multiple frame groups, the image feature generation section 61 receives input of the image of the target region 70 extracted from each of the multiple images included in the frame group. The image feature generation section 61 then outputs the first token and second token indicative of the respective features of the first object and second object in the target region 70. The encoder 62, the map generation section 63, and the token generation section 64 included in the image feature generation section 61 will be discussed later in detail.

With respect to a certain clip, the event prediction section 66 included in the overall learning model 54 outputs, on the basis of the first token and second token output for each of the multiple frame groups, first event information indicative of the presence or absence or the type of an event generated for the first object and second event information indicative of the presence or absence or the type of an event generated for the second object. The first predictor 67 and the second predictor 68 included in the event prediction section 66 will be discussed later in detail.

Using the image feature generation section 61 included in the overall learning model 54 which has been trained, the search section 57 searches the target video content for video content similar to a query video input as a query. The query video is a video that includes the just exact status desired to be detected from the video content and may be a portion of the video content constituting the query. Also, the search section 57 performs an index preparation process and a search process for searching for videos similar to the query video by using a prepared index.

In the index preparation process, the search section 57 generates multiple frame groups from the video content serving as the search target. For each of the multiple frame groups, the search section 57 inputs the target region 70 of each of the images included in the frame group to the trained image feature generation section 61 so as to obtain tokens. The search section 57 stores the tokens thus obtained into the storage 12 in association with information indicative of a temporal position of the frame group in the video content.

In the search process, the search section 57 generates multiple frame groups from the query video input as the query. For each of the multiple frame groups, the search section 57 inputs to the trained image feature generation section 61 the image of the target region 70 extracted from each of the multiple images included in the frame group, and acquires tokens (template tokens) from the image feature generation section 61. On the basis of degrees of similarity between multiple time-series template tokens obtained from the above process on one hand and the tokens stored in the storage 12 with respect to the video content serving as the search target on the other hand, the search section 57 determines a frame group similar to the query video and acquires information indicative of a segment position of the video content corresponding to the frame group. The search section 57 outputs as the search result the similar video content and the information indicative of the position of the similar segment therein. The search section 57 may reproduce the similar segment in the video content as well as immediately preceding and following segments therein.

Figure 3:
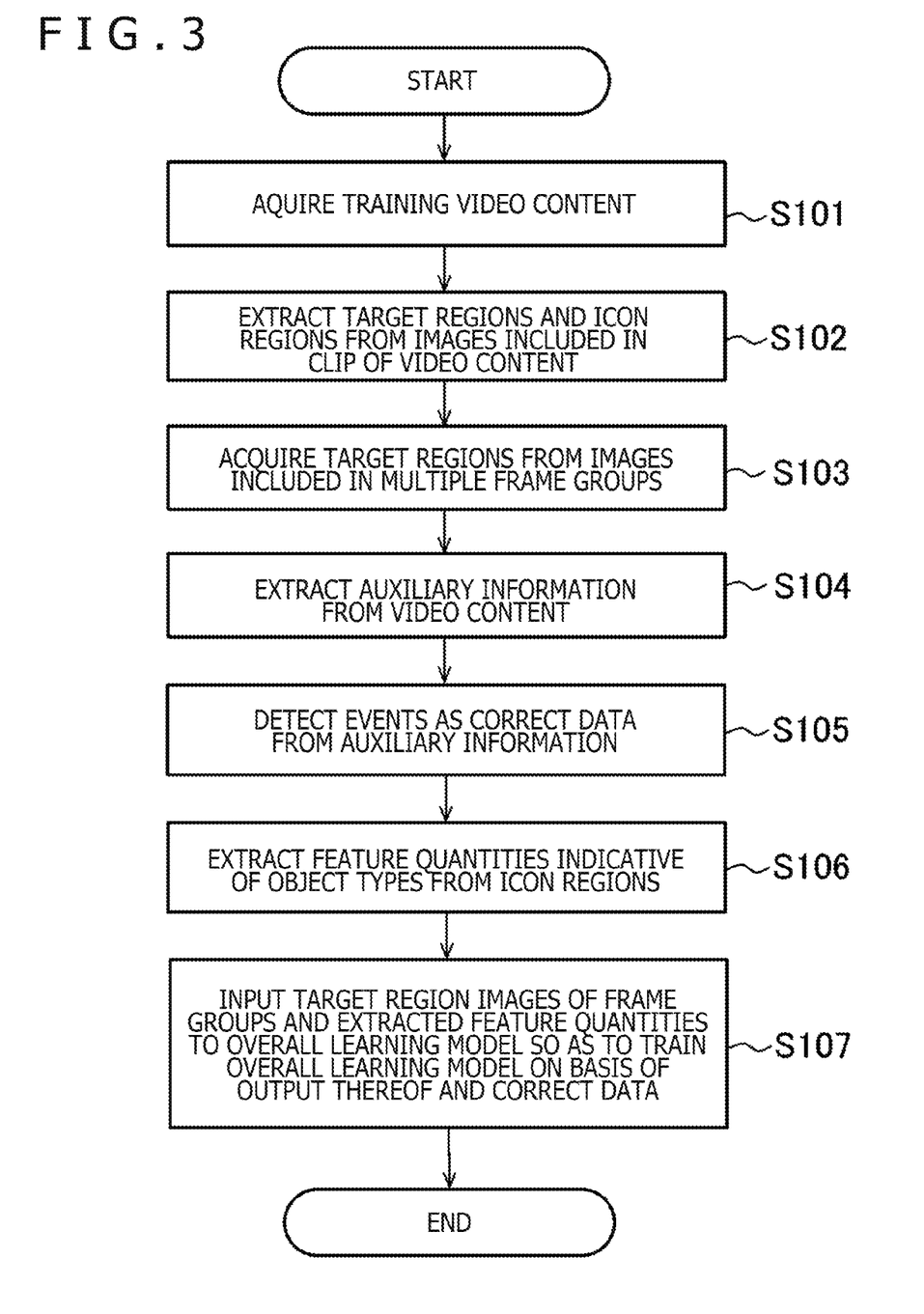
FIG. 3 is a flowchart depicting exemplary processes for training a machine learning model.

The training of the overall learning model 54 is explained below. FIG. 3 is a flowchart depicting exemplary processes for training the overall learning model 54. The processes in the flowchart of FIG. 3 are carried out for each of multiple clips extracted from video content. A time period for each of the multiple clips included in the video content (i.e., a training unit period) is constant. The start timing differs between the clips. Some frames of adjacent clips may or may not overlap with each other.

First, the information extraction section 51 acquires training video content that is input from the learning control section 55 (in step S101). The video content includes multiple time-series images and time-series audio data. More specifically, the information extraction section 51 acquires a clip from the video content and further obtains the audio data or images over a period corresponding to the timing of the clip.

Figure 4:
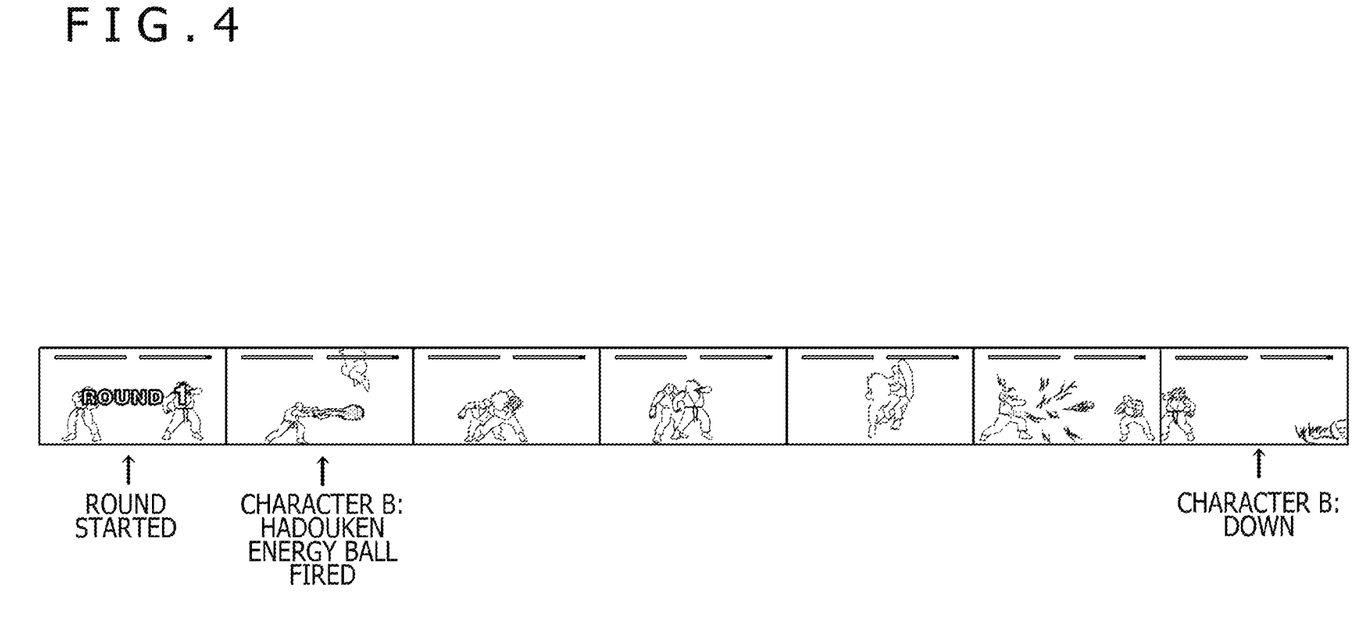
FIG. 4 is a diagram for schematically explaining an example of video content.

FIG. 4 is a diagram for schematically explaining an example of the video content. Rectangular regions arrayed horizontally in the drawing represent time-series images (corresponding to clips here). For example, the video content is a one-on-one fighting game play video as explained in reference to FIG. 4 and may include images and sound during game play. While FIG. 4 depicts prolonged time intervals between adjacent images (clips) for the purpose of explanation, the clip period may be one to two seconds in practice. Each clip may include 30 to 120 frame images.

The information extraction section 51 extracts (in step S102) the target region 70 and the icon regions from each of multiple images included in a clip of the video content (from each of multiple frame images included in the clip). The target region 70 is the region targeted for image analysis. The icon regions indicate the types of objects existing in the target region 70. Positions of these regions may be fixed.

Figure 5:
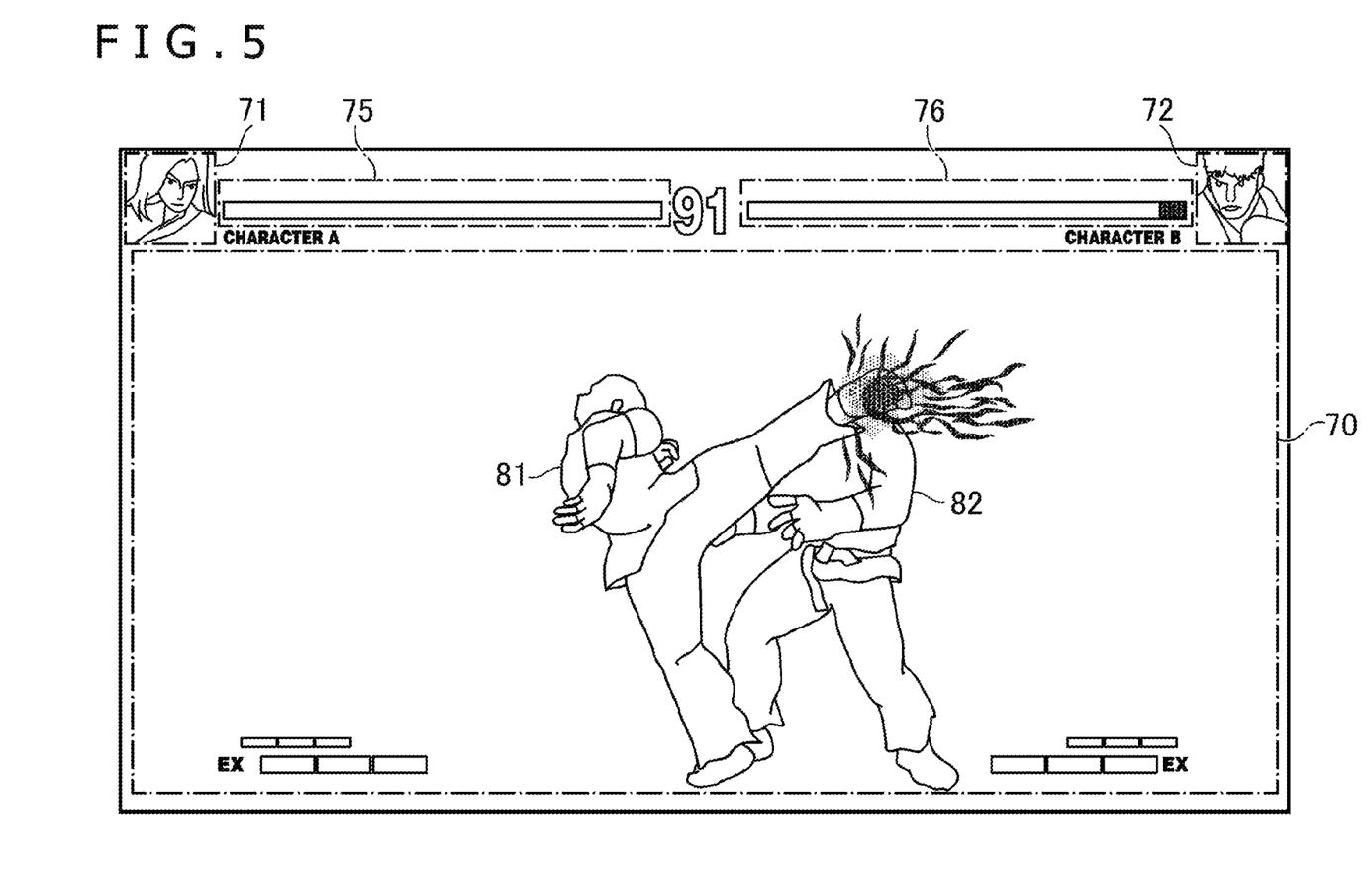
FIG. 5 is a diagram depicting an exemplary image.

FIG. 5 is a diagram depicting an exemplary image. The image in FIG. 5 is an image of a frame at a given timing in the video content. The icon regions include a first icon region 71 and a second icon region 72 in the image. The first icon region 71 and the second icon region 72 correspond respectively to a first object 81 and a second object 82 rendered in the target region 70. Inside the target region 70, the first object 81 may or may not be positioned on the left, and the second object 82 may or may not be positioned on the right, depending on the game play status.

A first auxiliary region 75 and a second auxiliary region 76 included in the image correspond respectively to the first object 81 and the second object 82. The target region 70, the first icon region 71, the second icon region 72, the first auxiliary region 75, and the second auxiliary region 76 are regions that differ from one another. The first auxiliary region 75 and the second auxiliary region 76 do not overlap with the target region 70. In the example in FIG. 5, the first auxiliary region 75 and the second auxiliary region 76 are images of hit-point (HP) gages indicative of remaining lives of the first object 81 and the second object 82, respectively. When each object is attacked by the opponent, the remaining life of the object indicated by the corresponding HP gage is diminished. Positions of the first auxiliary region 75 and the second auxiliary region 76 may also be fixed. While the target region 70 in FIG. 5 does not include the first icon region 71, the second icon region 72, the first auxiliary region 75, and the second auxiliary region 76, the target region 70 may include the first icon region 71 and the second icon region 72. The target region 70 may further include the first auxiliary region 75 and the second auxiliary region 76. The whole image may constitute the target region 70.

From the images of the target regions 70 extracted from the multiple images included in the clip, the information extraction section 51 acquires the target regions 70 of multiple frame groups to be input to the image feature generation section 61 (in step S103). Each of the frame groups includes consecutive k frames included in the clip. Here, "k" may be a predetermined integer of 1 or larger but smaller than the number of frames included in the clip. In a case where "k" is 2 or larger, the information extraction section 51 may acquire the image of the target region 70 extracted from each of the images of k frames (i.e., from each of the images of the frames included in the frame group) obtained through a sliding window, among the multiple frames included in the clip.

From the video content, the information extraction section 51 extracts auxiliary information (in step S104) in addition to the target region 70 and the icon regions (the first icon region 71 and the second icon region 72). Here, the auxiliary information may be the first auxiliary region 75 and the second auxiliary region 76 in the image or may be audio data indicative of the sound over the period corresponding to the timing of the clip including the image from which the target region 70 is extracted. The information extraction section 51 may extract the first auxiliary region 75 and the second auxiliary region 76 from an image that follows, by several frames, the clip including the image from which the target region 70 is extracted (or may extract them from an image corresponding to a timing at which a predetermined time period has elapsed after the clip).

The correct answer generation section 52 detects events as the correct data from the extracted auxiliary information (in step S105). The correct answer generation section 52 may perform its processing on a rule basis. For example, the correct answer generation section 52 may extract, as the auxiliary information, the first auxiliary region 75 and the second auxiliary region 76 at a timing at which a predetermined time period (e.g., one to five frames) has elapsed after the last frame in the clip. From each of the extracted first auxiliary region 75 and second auxiliary region 76, the correct answer generation section 52 may obtain changes in numerical values of parameters, such as the remaining lives, on the basis of sizes of regions of which the color has changed from a frame that precedes by a predetermined number of frames. On the basis of the obtained changes in numerical values, the correct answer generation section 52 may detect an event as the correct data for each of the objects. The correct answer generation section 52 may obtain numerical values indicated by the first auxiliary region 75 and the second auxiliary region 76 and detect events on the basis of changes of the obtained numerical values from the frame immediately preceding. Also, the correct answer generation section 52 may detect events on the basis of changes of each of the images themselves of the first auxiliary region 75 and the second auxiliary region 76, for example. The events as the correct data detected by the correct answer generation section 52 may be something that indicates changes in damage for each object or may be some other change.

Furthermore, the correct answer generation section 52 may convert to a mel-spectrogram the audio data over the period corresponding to the clip (e.g., a period starting from one to five frames after the last frame in the clip) and acquire the mel-spectrogram as the correct data. The processes of steps S104 and S105 may be carried out in parallel with steps S102 and S103 or prior to step S102.

The icon feature extraction section 53 extracts from the icon regions feature quantities indicative of the object types (in step S106). The icon feature extraction section 53 extracts a first feature vector indicative of the type of the first object 81 from the first icon region 71 and extracts a second feature vector indicative of the type of the second object 82 from the second icon region 72. Alternatively, the icon feature extraction section 53 may extract the icon regions only once from each video content or from each clip.

When the target region 70, the first feature vector, and the second feature vector have been extracted and the correct data has been detected (generated) accordingly, the learning control section 55 inputs to the overall learning model 54 the images of the target regions 70 acquired from one or multiple images included in multiple frame groups as well as the extracted first and second feature vectors for each clip. The learning control section 55 thus trains the overall learning model 54 on the basis of the output thereof and the correct data (in step S107).

Figure 6:
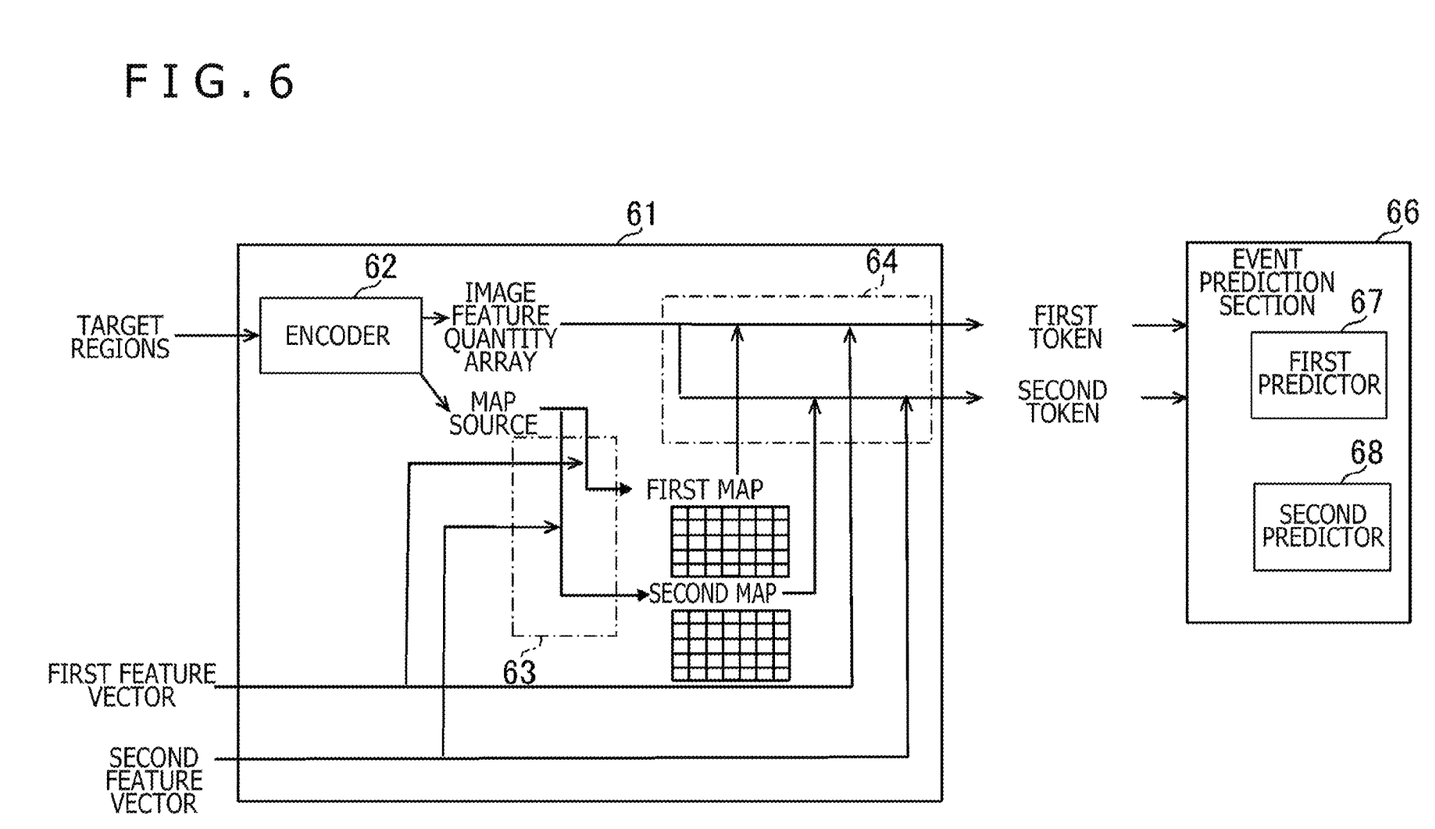
FIG. 6 is a diagram explaining a configuration of a machine learning model.

The overall learning model 54 is explained hereunder in more detail. FIG. 6 is a diagram explaining the configuration of the overall learning model 54. As explained above, the overall learning model 54 includes the image feature generation section 61 and the event prediction section 66. The image feature generation section 61 and the event prediction section 66 constitute one type of machine learning model and are the target for training by the above-described learning control section 55.

The image feature generation section 61 receives input of the target regions 70 of multiple images included in each of the frame groups acquired from the clip as well as the vectors corresponding to the objects. For each of the multiple frame groups acquired from the clip, the image feature generation section 61 outputs tokens indicative of the features regarding the events for the objects recognized from the target regions 70, the tokens corresponding to the input vectors.

The vectors corresponding to the objects are the first feature vector and the second feature vector extracted by the icon feature extraction section 53. Alternatively, the vectors corresponding to the objects may simply be vectors predetermined according to the object types. In this case, the vectors selected according to names of the objects displayed in the image may be input to the image feature generation section 61.

The image feature generation section 61 includes the encoder 62, the map generation section 63, and the token generation section 64. The encoder 62 receives input of the target regions 70 of multiple images included in the frame group. In turn, the encoder 62 outputs an image feature quantity array and a map source. The encoder 62 is one type of machine learning model including a neural network and may be a convolutional neural network known as ResNet (2+1)D, for example.

The map source is a matrix for use in generating an attention map. The size of the matrix is defined as Dk×H×W, where Dk stands for the number of elements in the first feature vector and the second feature vector, H for the height of the attention map, and W for the width of the attention map. The map source may be considered to include an internal vector of dimension Dk placed in each of (H×W) unit regions arranged in a matrix pattern. For example, Dk, H, and W may denote 64, 6, and 10, respectively. The image size may be 180×320, for example.

The image feature quantity array is a matrix used in conjunction with the attention map for generating tokens. The size of the image feature quantity array is given as Dt×H×W, where Dt stands for the number of elements of the vectors of tokens and also represents the number of channels. For example, Dt may denote 256. The attention map is a map indicative of the region regarding the object of interest in the image. The number of attention maps is the same as the number of objects. In the example in FIG. 6, two attention maps, i.e., a first map and a second map, are generated.

With the map source output, the map generation section 63 generates the attention map on the basis of the map source and the vectors indicative of the features of the objects input to the image feature generation section 61. More specifically, for each of the unit regions (as many as H×W) making up the attention map, the map generation section 63 obtains an inner product (the degree of similarity) between the internal vector of the map source and the first feature vector thereof and inputs the obtained inner product to a Softmax function to acquire a value (i.e., a weight), thereby generating a first attention map. Also, for each of the unit regions making up the attention map, the map generation section 63 obtains an inner product between the internal vector of the map source and the second feature vector thereof and inputs the obtained inner product to a Softmax function to acquire a value (i.e., a weight), thereby generating a second attention map.

With the attention maps generated, the token generation section 64 generates tokens on the basis of the generated attention maps and the image feature quantity array. The tokens indicate the features regarding the events for the objects. The number of tokens is the same as the number of objects. This process involves limiting the region of spatial interest in the image feature quantity array by use of the attention maps. Further, the token generation section 64 limits the channel of interest among multiple channels included in the image feature quantity array. In the example in FIG. 6, two tokens are generated, i.e., a first token indicative of the feature of the first object and a second token indicative of the feature of the second object. The first token and the second token are each a one-dimensional vector. The number of elements of the vectors is equal to Dt.

More specifically, for each of the Dt channels in the image feature quantity array, the token generation section 64 multiplies the value of each of H×W elements of the channel by the weight of the corresponding position in the attention map to obtain a sum of the products in a spatial direction (H×W) as the value of the elements of an intermediate vector of dimension Dt. The token generation section 64 then calculates the product between the elements of the intermediate vector and those of channel-weighted vectors to find the value of the vectors of the tokens of dimension Dt. Of the attention maps, the first attention map is used to calculate the elements in generating the first token, and the second attention map is used to calculate the elements in generating the second token.

The channel-weighted vectors include a first channel-weighted vector used to generate the first token and a second channel-weighted vector used to generate the second token. The first channel-weighted vector and the second channel-weighted vector are each a vector of dimension Dt and are generated respectively on the basis of the first feature vector and second feature vector indicative of the features of the respective objects. The channel-weighted vectors of dimension Dt may alternatively be generated by use of an inner product (a linear map) with a Dt×Dk parameter matrix of which the elements have a predetermined value each (e.g., a random value). In a case where Dt and Dk are the same value, the first feature vector and the second feature vector may be used unmodified as the first channel-weighted vector and the second channel-weighted vector.

Here, the token generation section 64 generates a positional encoding (PE) vector on the basis of an array of values each corresponding to the position of each of the regions in the attention map and on the basis of the attention map used for token generation. The PE vector is input, along with the tokens, to the event prediction section 66 (the first predictor 67 and the second predictor 68). The first predictor 67 and the second predictor 68, to which a set of the tokens and PE vector is input, each have a long short-term memory (LSTM) model. Alternatively, the first predictor 67 and the second predictor 68 may each have a transformer model.

The PE vector is generated by the process of positional encoding, to be described below. First, the token generation section 64 generates a grid array having the height and width same as those of the attention map, with [−1, −1] as the top left elements and [1, 1] as the bottom right elements (size: 2×H×W). The elements of the grid constitute a two-dimensional vector. Next, the token generation section 64 calculates the following vector for each of the grid elements [u, v].

$$[2^0*\sin(u), 2^0*\cos(u), 2^0*\sin(v), 2^0*\cos(v), \ldots, 2^{L-1}*\sin(u), 2^{L-1}*\cos(u), 2^{L-1}*\sin(v), 2^{L-1}*\cos(v)]$$

In the above formula, L stands for a hyper parameter, such as L=10. Then, in this example, dimension F of the vector is calculated to be 4×10=40. The token generation section 64 generates an array of F×H×W having the calculated vectors arrayed in a grid pattern. The token generation section 64 multiplies the value of each of the elements of H×W corresponding to each of the elements of the calculated vectors in the array by the weight of the corresponding position in the attention map to obtain a sum of the products in a spatial direction (H×W), thereby acquiring a vector of dimension 4×L. This provides the PE vector.

In the present embodiment, the image feature generation section 61 generates the tokens by using the attention map. On the other hand, the training data has no explicit position information regarding the objects for generating the attention map. The reason for this is that the map generation section 63 is configured to generate the attention map from the map source in keeping with the objects and that the overall learning model 54 including the map generation section 63 thus configured is trained to have the attention map focused on spots important for predicting event occurrence. In a case where there are multiple objects, the above configuration still makes it possible to utilize the attention map without explicitly designating the position of each object. Using the attention map for each object permits easier detection of the feature focused on a specific object in a video where there are multiple objects whose positions can be flipped horizontally, for example.

When the tokens have been generated for each of multiple frame groups acquired from the clip of the video content, the event prediction section 66 outputs, on the basis of these tokens, event information indicative of the presence or absence or the type of the event with respect to each object. The event information includes first event information indicative of the presence or absence or the type of the event occurring for the first object, and second event information indicative of the presence or absence or the type of the event occurring for the second object. The first predictor 67 outputs the first event information, and the second predictor 68 outputs the second event information. The first event information is generated on the basis of the first token and the second token. The second event information is generated likewise on the basis of the first token and the second token.

Figure 7:
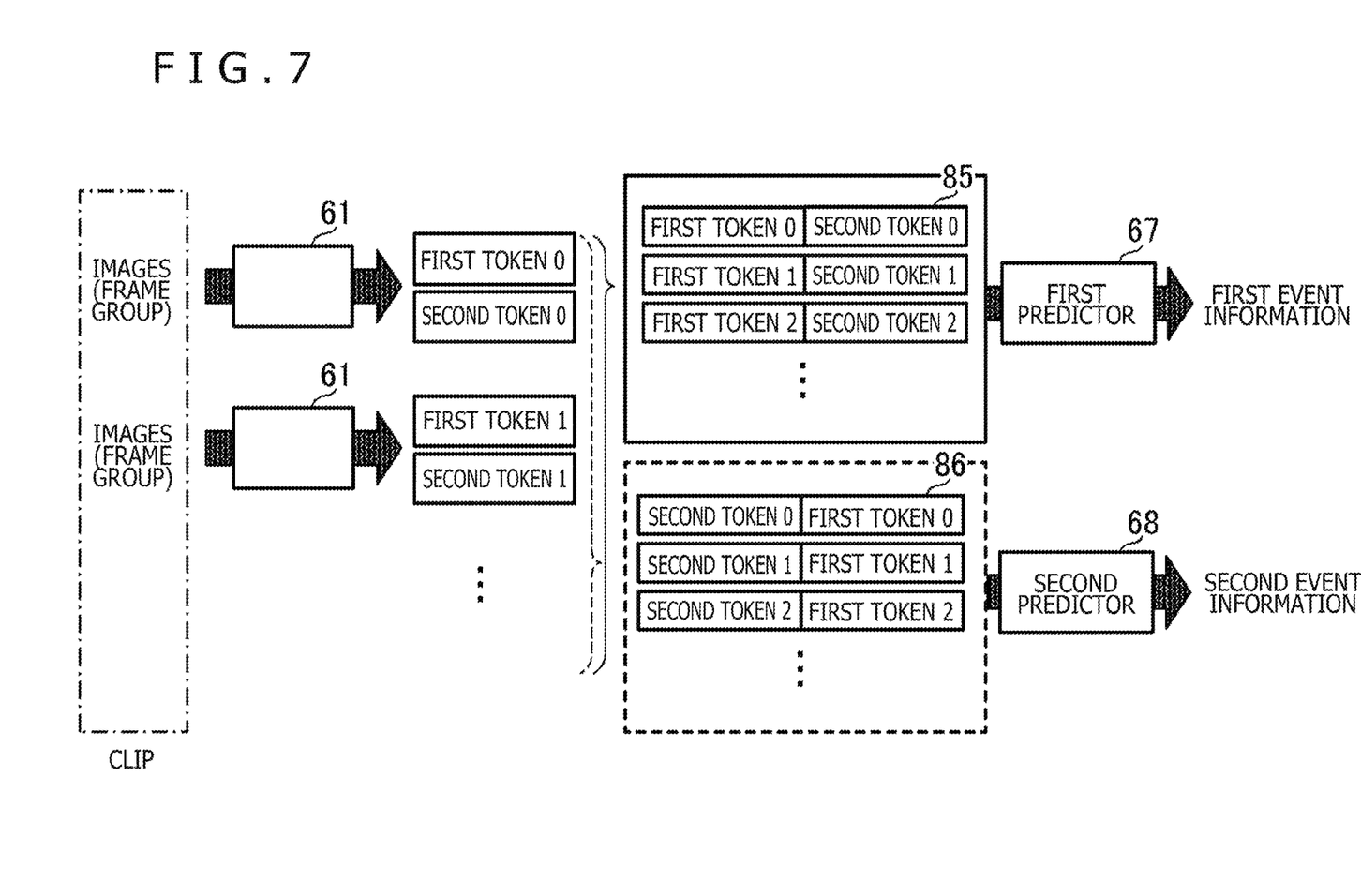
FIG. 7 is a diagram explaining processes performed by an event prediction section.

FIG. 7 is a diagram explaining processes performed by the event prediction section 66. From the first token and second token output from the image feature generation section 61 for each of multiple frame groups, the event prediction section 66 generates first link information to be input to the first predictor 67 and second link information to be input to the second predictor 68. The first link information may be a vector in which the elements of the first token and the elements of the second token are arrayed. The second link information may be information in which the elements of the first token and the elements of the second token are switched in the first link information. For example, the first link information may be formed by the sequentially arrayed elements of the first token followed additionally by the sequentially arrayed elements of the second token. The second link information may be formed by the sequentially arrayed elements of the second token followed additionally by the sequentially arrayed elements of the first token. Furthermore, the above-mentioned arrayed elements of the first token may be followed immediately by the elements of the PE vector generated along with the first token. The arrayed elements of the second token may be followed immediately by the elements of the PE vector generated together with the second token.

For each clip, multiple time-series pieces of the first link information and multiple time-series pieces of the second link information may be generated. The generated multiple time-series pieces of the first link information may be input to the first predictor 67 at one time, and the generated multiple time-series pieces of the second link information may be input to the second predictor 68 also at one time.

The first predictor 67 and the second predictor 68 are each one type of machine learning model and may each include what is generally called a transformer model or a recurrent neural network (RNN). The first predictor 67 outputs as a label the first event information indicative of the event that occurs, on the basis of the multiple time-series pieces of the first link information. The second predictor 68 outputs as a label the second event information indicative of the event that occurs, on the basis of the multiple time-series pieces of the second link information. The first event information and the second event information may be predictive scores indicative of the probabilities of events occurring for the first object and the second object, respectively. The time-series first link information and the time-series second link information allow the first predictor 67 and the second predictor 68 to predict the events on the basis of temporal changes in the status.

Here, the first predictor 67 and the second predictor 68 have the same internal configuration and have learning parameters in common. Given the features of the data in the first link information and the second link information, the first predictor 67 and the second predictor 68 can normally be trained even when their internal configuration and learning parameters are the same. The same predictors are each configured to switch the object constituting the prediction target, according to the order of information linkage (for example, the event for the object corresponding to a former side piece of linked information is normally predicted). This provides training in such a manner that the formats of the information regarding the first object and the second object become the same. As a result of the training, there is no object-specific information in the tokens. It is thus expected that, with the attention maps each assuming the role of identifying the object, the tokens retain the information regarding the (object-independent) events in a role-sharing scheme.

On the basis of the output of the event prediction section 66 and the correct data generated by the correct answer generation section 52, the learning control section 55 adjusts the learning parameters of the machine learning model (the encoder 62, the first predictor 67, and the second predictor 68) included in the overall learning model 54. For example, the learning parameters are weights in the neural network and may be adjusted by what is generally called back propagation.

In the present embodiment, the correct data for training the machine learning model is not prepared manually but generated primarily on a rule basis from the information included in the same video content. This makes it easy to prepare learning data, so that the features regarding the events in the video can be detected more easily by using the machine learning model. In the video content such as a game play video, changes in specific regions and in sound in the images are highly likely to be related to events. When the correct data is generated from such information, it is possible to maintain consistent quality of the correct data.

The event prediction section 66 may be different from what has been described above. Alternatively, the event prediction section 66 may be a machine learning model that predicts a mel-spectrogram of sound on the basis of the input tokens, for example. In this case, the overall learning model 54 may be trained on the basis of the learning data including both the vectors indicative of the features of the frame groups and objects acquired from the clip and the mel-spectrogram obtained by the correct answer generation section 52 as the correct data.

In a case where there are not many types of objects, the feature quantities indicative of the object features may not be used. More specifically, the information extraction section 51 may not extract the icon regions or perform the process of step S105. The image feature generation section 61 may not receive input of the feature quantities. In this case, the image feature generation section 61 may have a well-known configuration that uses attention maps. Where that configuration is adopted or where the overall learning model 54 is configured to directly predict events without outputting tokens, the learning method described in conjunction with the present embodiment still permits training without explicitly generating the correct data.

Figure 8:
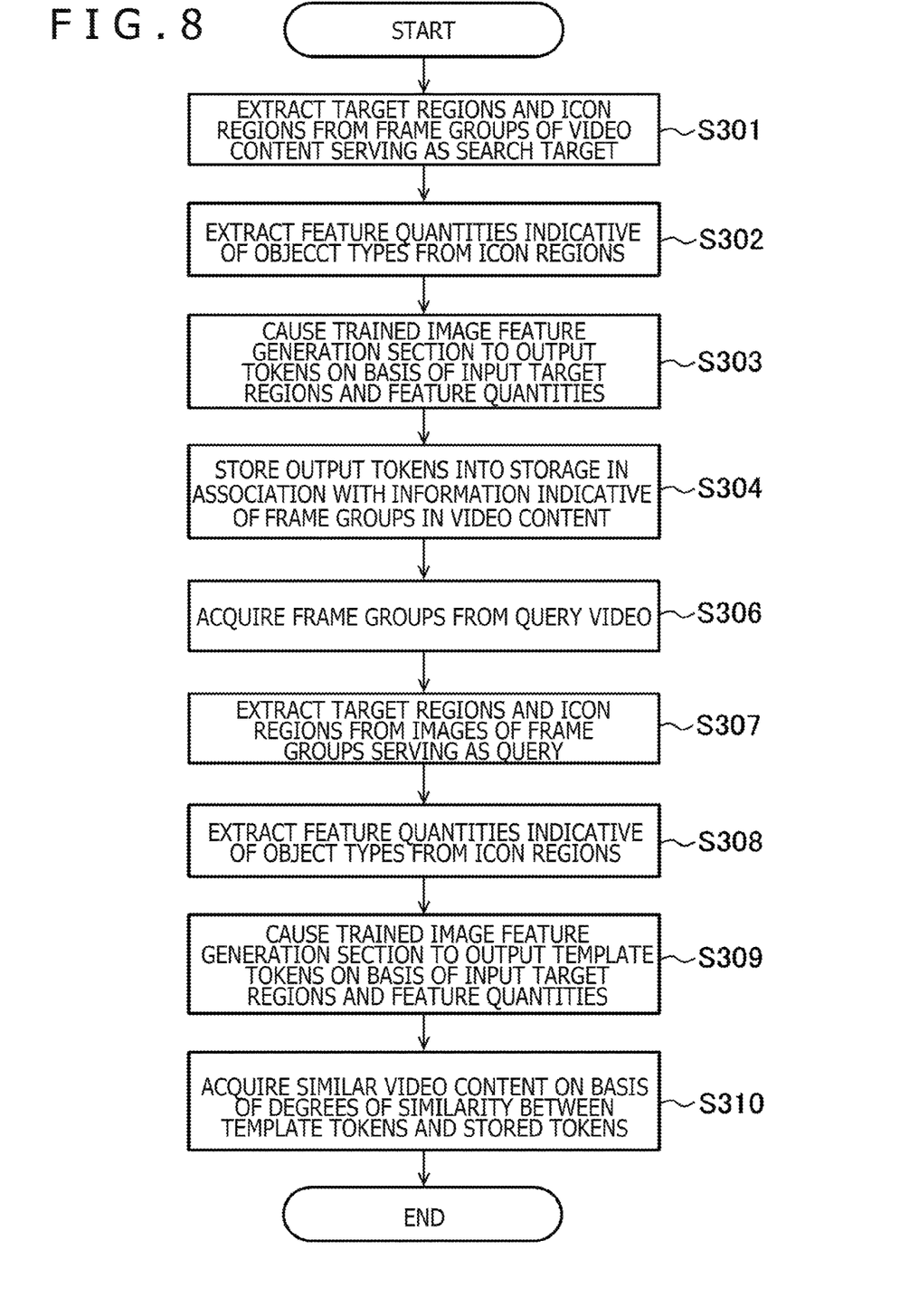
FIG. 8 is a flowchart depicting processes related to a search through video content by a search section.

How to use the trained machine learning model is explained hereunder. FIG. 8 is a flowchart depicting processes related to a search through video content by the search section 57. In FIG. 8, the processes of steps S301 to S304 constitute an index preparation process, and the processes of step S306 to S310 make up a search process. The index preparation process involves extracting the tokens of the frame groups included in the video content constituting the search target, and storing the extracted tokens into the storage 12 in association with information indicative of the frame groups in the video content (e.g., with information indicative of segments corresponding to the frame groups of interest in the video content). The search process involves acquiring template tokens regarding a query video by using both the tokens stored in the storage 12 and the trained image feature generation section 61 and, on the basis of the degrees of similarity between the acquired template tokens and the stored tokens, detecting similar video content and the segments therein.

First, the information extraction section 51 generates multiple frame groups from the video content constituting the search target and extracts the target region 70 and icon regions of one or multiple images included in the frame groups (in step S301). The frame groups are similar to those that have been discussed above. The icon feature extraction section 53 then extracts the feature quantities indicative of the object types from the icon regions (in step S302). Details of the processes of steps S301 and S302 are similar to those of the processes of steps S102, S103, and S106 in FIG. 3. Note here that the auxiliary information is not extracted, and that the correct data is not generated on the basis of the auxiliary information.

The trained image feature generation section 61 then receives input of the target regions 70 and feature quantities of the images included in the multiple frame groups. The image feature generation section 61 outputs tokens with respect to the input multiple target regions 70 and feature quantities (in step S303). The search section 57 stores into the storage 12 (in step S304) the tokens output for each of the frame groups in association with information indicative of the frame groups including the images targeted for region extraction in the video content (e.g., with information indicative of the temporal position of the head of each frame group). The processes of steps S301 to S304 may be carried out for each of the frame groups included in the video content as well as for each of multiple pieces of video content.

After the tokens output for each of the frame groups included in the video content have been stored in the storage 12, the search section 57 acquires multiple frame groups from a query video (in step S306). The information extraction section 51 then extracts the target region 70 and icon regions from each of the images included in the frame groups serving as the query (in step S307). The icon feature extraction section 53 extracts the feature quantities indicative of the object types from the icon regions (in step S308). The method of extracting the target region 70 and icon regions is the same as in steps S102 and S103 in FIG. 3, and the method of extracting the feature quantities is the same as in step S106.

For each of the frame groups, the trained image feature generation section 61 receives input of the target regions 70 and feature quantities of the images included in the frame group serving as the query. The image feature generation section 61 outputs the tokens (the template tokens) regarding the input frame group (in step S309).

On the basis of the degrees of similarity between the tokens stored in the storage 12 and the output template tokens, the search section 57 acquires video content which is similar to the query image and which becomes the search target (in step S310). More specifically, the search section 57 calculates the degrees of similarity between the multiple template tokens derived from the query video on one hand and the multiple tokens stored in association with the frame groups in the video content serving as the search target on the other hand, so as to obtain scores based on the calculated degrees of similarity. Then, on the basis of information indicative of a frame group of which the score is higher than a threshold value (i.e., a similar frame group), the search section 57 acquires both the video content that includes the frame group and the position of that frame group in the video content.

The search section 57 outputs information indicative of the acquired segment in the video content. The information to be output may be information indicative of the temporal position of a unit video or may be video data including the immediately preceding and following unit videos in the video content.

In the present embodiment, the overall learning model 54 is trained by use of the events serving as the correct data generated from the video content. Only a portion of the trained machine learning model is used for searches following the training. In other words, the tokens output from the image feature generation section 61 as part of the trained overall learning model 54 are used to detect the timing in the similar video content. This is made possible by the above-described learning method in which the tokens include the information regarding the events in the video content. This method also permits automatic recognition of the status of each scene in the video content.

It should be understood by those skilled in the art that various modifications, combinations, sub-combinations and alterations may occur depending on design requirements and other factors insofar as they are within the scope of the appended claims or the equivalents thereof.

What is claimed is:
1. An image analysis system comprising:
a machine learning model configured to receive input of an image and to output an image feature quantity and a map source for image analysis; and
processing circuitry configured to:
generate, based on vectors corresponding to a set of objects and the output map source, an attention map indicative of a region associated with the set of objects in the image, wherein, when the set of objects includes a first object and a second object of multiple different objects in the image, the vectors corresponding to the set of objects are generated such that vectors corresponding to different objects have metric spaces therebetween;
generate a token indicative of a feature associated with an event of each of the first object and the second object on a basis of the generated attention map and the image feature quantity;
receive input of first link information in which a token generated for the first object and a token generated for the second object are arrayed, and output a first event predicted for the first object; and
receive input of second link information in which the token for the first object and the token for the second object in the first link information are switched with each other, and output a second event predicted for the second object; and
provide the first event predicted for the first object and the second event predicted of the second object, wherein first event prediction and second event prediction have a learning parameter in common.

2. The image analysis system according to claim 1, wherein the processing circuitry is further configured to
train the machine learning model by use of training data including training images, information corresponding to objects that is found in the training images and targeted for prediction of an event, and a label indicative of each event associated with an object of the objects in the training images.

3. The image analysis system according to claim 2, wherein the processing circuitry is further configured to
generate a token indicative of a feature associated with the event of the object based on an attention map, the image feature quantity, and a vector corresponding to the object.

4. The image analysis system according to claim 1,
wherein the map source has multiple unit regions arrayed in a matrix, each of the unit regions including an internal vector having a predetermined number of elements, and
the attention map is generated based on an inner product between the vectors corresponding to the objects and the internal vector at each of multiple points.

5. The image analysis system according to claim 1, wherein the machine learning model, is trained by use of training data including training images, information corresponding to objects that is found in the training images and is targeted for prediction of events, and a label indicative of each of the events of the objects in the training images.

6. An image analysis method comprising:
by a machine learning model, receiving input of an image and outputting an image feature quantity and a map source for image analysis;
generating, based on vectors corresponding to a set of objects and the output map source, an attention map indicative of a region associated with the set of objects in the image, wherein, when the set of objects includes a first object and a second object of multiple different objects in the image, the vectors corresponding to the set of objects are generated such that vectors corresponding to different objects have metric spaces therebetween;
generating a token indicative of a feature associated with an event of each of the first object and the second object on a basis of the generated attention map and the image feature quantity;
receiving input of first link information in which a token generated for the first object and a token generated for the second object are arrayed, and output a first event predicted for the first object; and
receiving input of second link information in which the token for the first object and the token for the second object in the first link information are switched with each other, and output a second event predicted for the second object; and
providing the first event predicted for the first object and the second event predicted of the second object, wherein first event prediction and second event prediction have a learning parameter in common.

7. The image analysis method according to claim 6, further comprising:
training the machine learning model by use of training data including training images, information corresponding to objects that is found in the training images and targeted for prediction of an event, and a label indicative of each event associated with an object of the objects in the training images.

8. The image analysis method according to claim 7, further comprising:
generating a token indicative of a feature associated with the event of the object based on an attention map, the image feature quantity, and a vector corresponding to the object.

9. The image analysis method according to claim 6,
wherein the map source has multiple unit regions arrayed in a matrix, each of the unit regions including an internal vector having a predetermined number of elements, and
the attention map is generated based on an inner product between the vectors corresponding to the objects and the internal vector at each of multiple points.

10. A non-transitory computer-readable storage medium storing computer-readable instructions thereon which, when executed by a computer, cause the computer to perform a method, the method comprising:
by a machine learning model, receiving input of an image and outputting an image feature quantity and a map source for image analysis;
generating, based on vectors corresponding to a set of objects and the output map source, an attention map indicative of a region associated with the set of objects in the image, wherein, when the set of objects includes a first object and a second object of multiple different objects in the image, the vectors corresponding to the set of objects are generated such that vectors corresponding to different objects have metric spaces therebetween;
generating a token indicative of a feature associated with an event of each of the first object and the second object on a basis of the generated attention map and the image feature quantity;
receiving input of first link information in which a token generated for the first object and a token generated for the second object are arrayed, and output a first event predicted for the first object; and
receiving input of second link information in which the token for the first object and the token for the second object in the first link information are switched with each other, and output a second event predicted for the second object; and
providing the first event predicted for the first object and the second event predicted of the second object, wherein first event prediction and second event prediction have a learning parameter in common.

11. The non-transitory computer-readable storage medium according to claim 10, wherein the instructions thereon which, when executed by the computer, cause the computer to perform:
  training the machine learning model by use of training data including training images, information corresponding to objects that is found in the training images and targeted for prediction of an event, and a label indicative of each event associated with an object of the objects in the training images.

12. The non-transitory computer-readable storage medium according to claim 11, wherein the processing circuitry is further configured to
  generating a token indicative of a feature associated with the event of the object based on an attention map, an image feature quantity, and a vector corresponding to the object.

13. The non-transitory computer-readable storage medium according to claim 10,
  wherein the map source has multiple unit regions arrayed in a matrix, each of the unit regions including an internal vector having a predetermined number of elements, and
  the attention map is generated based on an inner product between the vectors corresponding to the objects and the internal vector at each of multiple points.

* * * * *